US008891741B2

(12) United States Patent
Samarasinghe

(10) Patent No.: US 8,891,741 B2
(45) Date of Patent: *Nov. 18, 2014

(54) CALL CONTROL ELEMENT CONSTRUCTING A SESSION INITIATION PROTOCOL (SIP) MESSAGE INCLUDING PROVISIONS FOR INCORPORATING ADDRESS RELATED INFORMATION OF PUBLIC SWITCHED TELEPHONE NETWORK (PSTN) BASED DEVICES

(75) Inventor: Harish Samarasinghe, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 566 days.

This patent is subject to a terminal disclaimer.

(21) Appl. No.: 13/235,926

(22) Filed: Sep. 19, 2011

(65) Prior Publication Data

US 2012/0069982 A1 Mar. 22, 2012

Related U.S. Application Data

(63) Continuation of application No. 12/400,656, filed on Mar. 9, 2009, now Pat. No. 8,023,623, which is a continuation of application No. 10/375,820, filed on Feb. 27, 2003, now Pat. No. 7,508,923.

(51) Int. Cl.
*H04M 11/00* (2006.01)
*H04L 29/06* (2006.01)
*H04M 7/12* (2006.01)

(52) U.S. Cl.
CPC ........... *H04M 7/123* (2013.01); *H04L 65/1033* (2013.01); *H04L 65/1069* (2013.01); *H04L 65/1006* (2013.01)
USPC ..................... 379/88.13; 379/88.17; 379/229; 370/352; 370/353; 370/410; 370/426

(58) Field of Classification Search
USPC ............ 379/88.08, 88.16, 88.17, 93.23, 161, 379/167.01, 201.01, 201.11, 215.01, 379/220.01, 221.01, 229, 265.09, 88.13; 370/312, 352; 455/408, 426.1
See application file for complete search history.

(56) References Cited

U.S. PATENT DOCUMENTS

| | | | |
|---|---|---|---|
| 6,038,230 A | 3/2000 | Ofek | |
| 6,161,134 A | 12/2000 | Wang et al. | |
| 6,240,391 B1 | 5/2001 | Ball et al. | |
| 6,259,691 B1 | 7/2001 | Naudus | |
| 6,272,131 B1 | 8/2001 | Ofek | |
| 6,272,132 B1 | 8/2001 | Ofek et al. | |

(Continued)

OTHER PUBLICATIONS

Requena, "System and Methods for Using an Application Layer Control Protocol Transporting Spatial Location Information Pertaining to Devices to Wired Internet Protocol Networks", US 2002-0126701, Sep. 12, 2002.

(Continued)

*Primary Examiner* — Md S Elahee

(57) ABSTRACT

A Session Initiation Protocol (SIP) message adapted for use by a multi-media services provider system to form a multi-media communication path between at least a calling communication device adapted to operate using a first protocol (e.g. SIP) and at least a destination communication device adapted to operate using a second protocol, such as Integrated Services Digital Network User Part (ISUP). The SIP message includes a header region having a number of header fields, a first body region having Session Description Protocol (SDP) information related to the calling communication device and a second body region having ISUP related addressing information associated with the destination communication device.

12 Claims, 2 Drawing Sheets

(56) References Cited

U.S. PATENT DOCUMENTS

| | | |
|---|---|---|
| 6,330,236 B1 | 12/2001 | Ofek et al. |
| 6,377,579 B1 | 4/2002 | Ofek |
| 6,421,674 B1 | 7/2002 | Yoakum et al. |
| 6,434,143 B1 | 8/2002 | Donovan |
| 6,438,555 B1 | 8/2002 | Orton |
| 6,446,127 B1 | 9/2002 | Schuster et al. |
| 6,477,150 B1 | 11/2002 | Maggenti et al. |
| 6,480,588 B1 | 11/2002 | Donovan |
| 6,483,600 B1 | 11/2002 | Schuster et al. |
| 6,615,236 B2 | 9/2003 | Donovan et al. |
| 6,694,145 B2 | 2/2004 | Riikonen et al. |
| 6,735,621 B1 | 5/2004 | Yoakum et al. |
| 6,741,695 B1 | 5/2004 | McConnell et al. |
| 6,766,007 B1 | 7/2004 | Dermler et al. |
| 6,771,639 B1 | 8/2004 | Holden |
| 6,775,269 B1 | 8/2004 | Kaczmarczyk et al. |
| 6,879,828 B2 | 4/2005 | Virtanen et al. |
| 6,885,658 B1 | 4/2005 | Ress et al. |
| 6,888,828 B1 | 5/2005 | Partanen et al. |
| 6,904,140 B2 | 6/2005 | Trossen |
| 6,934,279 B1 | 8/2005 | Sollee et al. |
| 6,947,724 B2 | 9/2005 | Chaney |
| 6,963,635 B1 | 11/2005 | Jones |
| 7,020,707 B2 | 3/2006 | Sternagle |
| 7,035,248 B2 | 4/2006 | Wengrovitz |
| 7,054,945 B2 | 5/2006 | Hurtta et al. |
| 7,058,068 B2 | 6/2006 | Gawargy et al. |
| 7,085,260 B2 | 8/2006 | Karaul et al. |
| 7,123,700 B1 | 10/2006 | Weaver et al. |
| 7,142,534 B1 | 11/2006 | Whent et al. |
| 7,167,468 B2 | 1/2007 | Donovan |
| 7,184,418 B1 | 2/2007 | Baba et al. |
| 7,369,844 B2 | 5/2008 | Hestir |
| 7,508,923 B1 | 3/2009 | Samaarasinghe |
| 8,023,623 B2 | 9/2011 | Samaarasinghe |
| 2002/0062379 A1 | 5/2002 | Widegren et al. |
| 2002/0110113 A1 | 8/2002 | Wengrovitz |
| 2002/0126701 A1 | 9/2002 | Requena |
| 2002/0136206 A1 | 9/2002 | Gallant et al. |
| 2002/0141381 A1 | 10/2002 | Gawargy et al. |
| 2002/0141404 A1 | 10/2002 | Wengrovitz |
| 2002/0147818 A1 | 10/2002 | Wengrovitz |
| 2002/0156903 A1 | 10/2002 | Bach Corneliussen |
| 2002/0176559 A1 | 11/2002 | Adamek et al. |
| 2003/0058838 A1 | 3/2003 | Wengrovitz |
| 2003/0079020 A1 | 4/2003 | Gourraud et al. |
| 2003/0110292 A1 | 6/2003 | Takeda et al. |
| 2003/0179762 A1 | 9/2003 | Isomaki et al. |
| 2003/0223570 A1 | 12/2003 | Partanen et al. |
| 2004/0103157 A1 | 5/2004 | Requena et al. |
| 2004/0120498 A1 | 6/2004 | Sylvain |
| 2005/0021616 A1 | 1/2005 | Rajahalme et al. |

OTHER PUBLICATIONS

Gawargy et al., "Session Iniation Protocol Based Advanced Intelligent Network/Intelligent Network Messaging," US 2002-0141381, Oct. 3, 2002.

CALL CONTROL ELEMENT CONSTRUCTING A SESSION INITIATION PROTOCOL (SIP) MESSAGE INCLUDING PROVISIONS FOR INCORPORATING ADDRESS RELATED INFORMATION OF PUBLIC SWITCHED TELEPHONE NETWORK (PSTN) BASED DEVICES

CROSS REFERENCE TO RELATED APPLICATIONS

This application is a continuation of U.S. patent application Ser. No. 12/400,656 filed Mar. 9, 2009 now U.S. Pat. No. 8,023,623, which is currently allowed and is a continuation of U.S. patent application Ser. No. 10/375,820 filed Feb. 27, 2003, now U.S. Pat. No. 7,508,923, all of which are herein incorporated by reference in their entirety.

FIELD OF THE INVENTION

The present invention relates generally to a SIP message adapted to efficiently communicate information between a number of network elements of a communication system, and more specifically, to a SIP INVITE message which employs a format and/or parameters that permit inclusion of addressing related information of PSTN-based communication devices, as well as provisions for efficient processing of the addressing information.

BACKGROUND

Presently, SIP is becoming an increasingly popular protocol for transporting both standard and non-standard information in a common framework over Internet Protocol (IP) based Local Area Networks (LANs). For example, LANs including IP-based multi-media service provider systems may include systems and services provided by AT&T. However, Wide Area Networks (WANs) provided by other various communications service providers continue to employ a combination of IP-based communication devices and/or equipment and Public Switched Telephone Networks (PSTNs) or circuit-based communication devices and/or equipment, as well as a number of other circuit-based components and/or equipment. The PSTN-based communication devices use Integrated Services Digital Network User Part (ISUP) as a protocol for transporting information over the PSTN. However, each multi-media communication service provider system operating on a LAN (e.g. IP-based) is required to interface with the WAN (IP-based and/or PSTN based) in order to communicate information over the WAN to SIP-based and/or PSTN-based communication devices.

One problem arises when a request for multi-media services arrives at a multi-media services provider system operating on a LAN from an IP-based calling communication device that requires a media path to be formed between the IP-based calling communication device and a PSTN-based destination communication device. The problem relates to the fact that the SIP protocol employed by the IP-based multi-media service provider system operating on the LAN does not include a provision for including complete address specific information in outgoing SIP messages, which are sent from the multi-media services provider system to the PSTN-based communication device. As a result, the IP-based multi-media services provider system operating on the LAN is presently unable to deliver complete address specific information during setting up calls and/or forming multi-media paths between a calling communication device and destination communication device when the calling communication device is an IP-based communication device and the destination communication device is a PSTN or circuit-based communication device.

Therefore, an unsolved need remains for a SIP protocol message, such as a SIP INVITE message, which employs a format and/or parameters that permit inclusion of complete address specific information of PSTN-based or circuit-based communication devices and the originating party's Privacy Screening Indicator Information, as well as provisions for efficient processing of the addressing information.

SUMMARY OF THE INVENTION

In one aspect of the present invention, set forth is a method of forming a multi-media communication path between at least a calling communication device adapted to operate using a first protocol and at least a destination communication device adapted to operate using a second protocol. The method includes receiving a request for a multi-media service at a call control element of a multi-media provider system. The call request is processed at the call control element for generating a Session Initiation Protocol (SIP) message. The SIP message is sent to the destination communication device to form the multi-media communication path between the calling communication device and the destination communication device. The SIP message can include at least one body portion having predetermined address specific information associated with the destination communication device of the plurality of communication devices and Privacy Information associated with the calling communication device.

In one aspect, generating the SIP message includes providing address specific Integrated Services Digital Network User Part (ISUP) signaling information in the at least one body portion of the SIP message. The ISUP signaling information can include providing Nature of Address information, Numbering Plan Type information, Calling Party Number information, Privacy Restriction Indicator information and/or Screening Indicator information. Further, the ISUP signaling information, which is included in the SIP message, can be represented as a plurality of alpha-numeric values arranged into a predetermined number of signaling parameters.

In another aspect of the present invention, set forth is a Session Initiation Protocol (SIP) message adapted for communication between a plurality of network elements to form a multi-media communication path between at least a calling communication device adapted to operate using a first protocol and at least a destination communication device adapted to operate using a second protocol. The (SIP) message includes a header region, a first body region and a second body region. The second body region includes predetermined address specific information associated with the destination communication device and privacy restriction information associated with the calling communication device.

In one aspect, the predetermined address information includes Integrated Services Digital Network User Part (ISUP) related information. The ISUP related information can include Nature of Address information, Numbering Plan Type information, Calling Party Number information, Privacy Restriction Indicator information and/or Screening Indicator information. The ISUP related information can be represented in the second body region of the SIP message as a plurality of alpha-numeric values arranged into a predetermined number of groups.

In one aspect, the first body region includes Session Description Protocol (SDP) information associated with the calling communication device of the plurality of communication devices.

BRIEF DESCRIPTION OF THE DRAWING

The foregoing and other objects of this invention, the various features thereof, as well as the invention itself, can be more fully understood from the following description, when read together with the accompanying drawings in which.

DETAILED DESCRIPTION OF THE INVENTION

Figure 1:
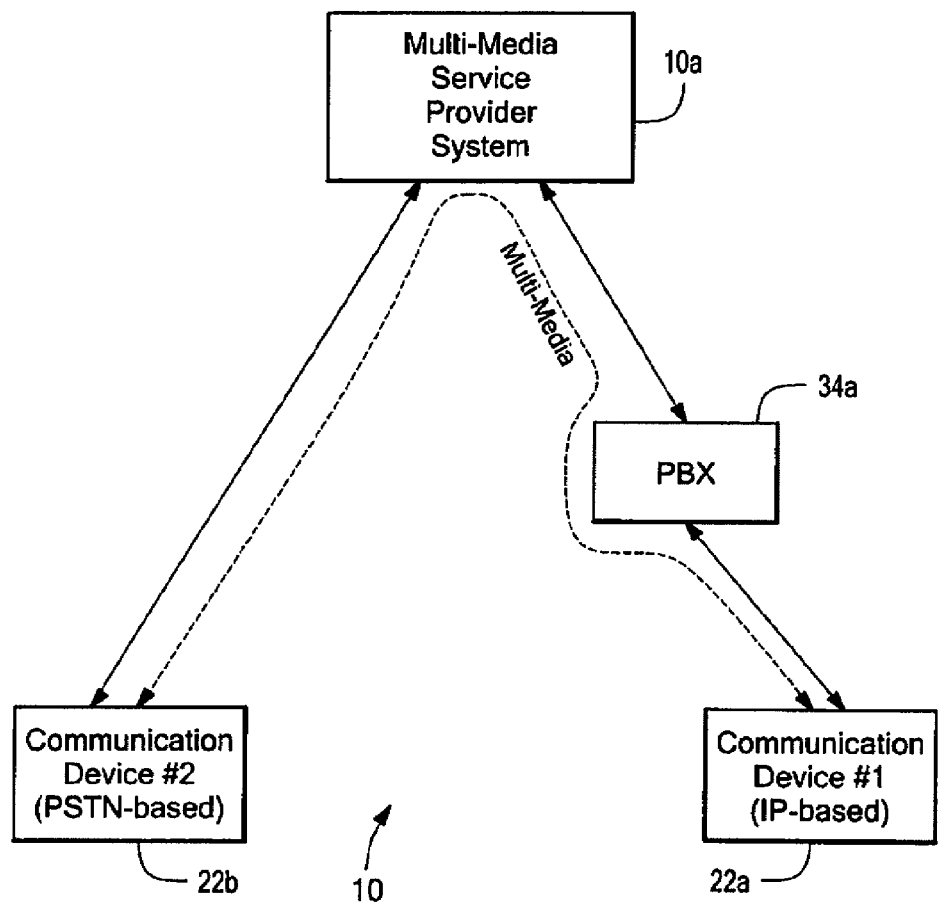
FIG. 1 is an exemplary high-level schematic block diagram of a system for providing multi-media communications between a plurality of communication devices according to the present invention.

In accordance with principles of the present invention, set forth is a SIP INVITE message (hereinafter "INVITE message") having predetermined content and format, which is adapted for communicating information between various elements of a communications system, such as the multi-media services provider system 10a, as described below in connection with FIGS. 1 and 2. The INVITE message is further adapted to communicate information between the multi-media services provider system 10a and other various external network devices, such as the PSTN-based communication devices 22b, for example. The INVITE message generally includes a header portion having a number of header fields. Further, the INVITE message includes a first body portion having Session Description Protocol (SDP) information related to a communication device 22a, for example, which originated a request to the multi-media services provider system 10a for multimedia services. The INVITE message further includes a second body portion that includes complete address specific information of a destination communication device 22b and the calling party's (e.g. communication device 22a) Privacy Screening Indicator Information for ISUP signaling, which will be described in further detail below.

Referring now to FIG. 1, shown is one embodiment of a communication network 10 for providing multi-media communications between at least a first IP-based communication device 22a (hereinafter referred to as "first communication device 22a") of a plurality of IP-based communication devices and second PSTN-based communication device 22b (hereinafter referred to as "second communication device 22b") of a plurality of PSTN-based communication devices, in accordance with the present invention. The communication network 10 includes an IP-based multi-media provider system 10a, which is operative to provide a plurality of multi-media services to the first communication device 22a, via the first IP-Private Branch Exchange 34a (hereinafter referred to as "PBX 34a"), and to the second communication device 22b. It should be understood that the multi-media services provider system 10a is additionally operative to provide a plurality of multi-media services to a plurality of other communication devices not specifically shown herein.

Figure 2:
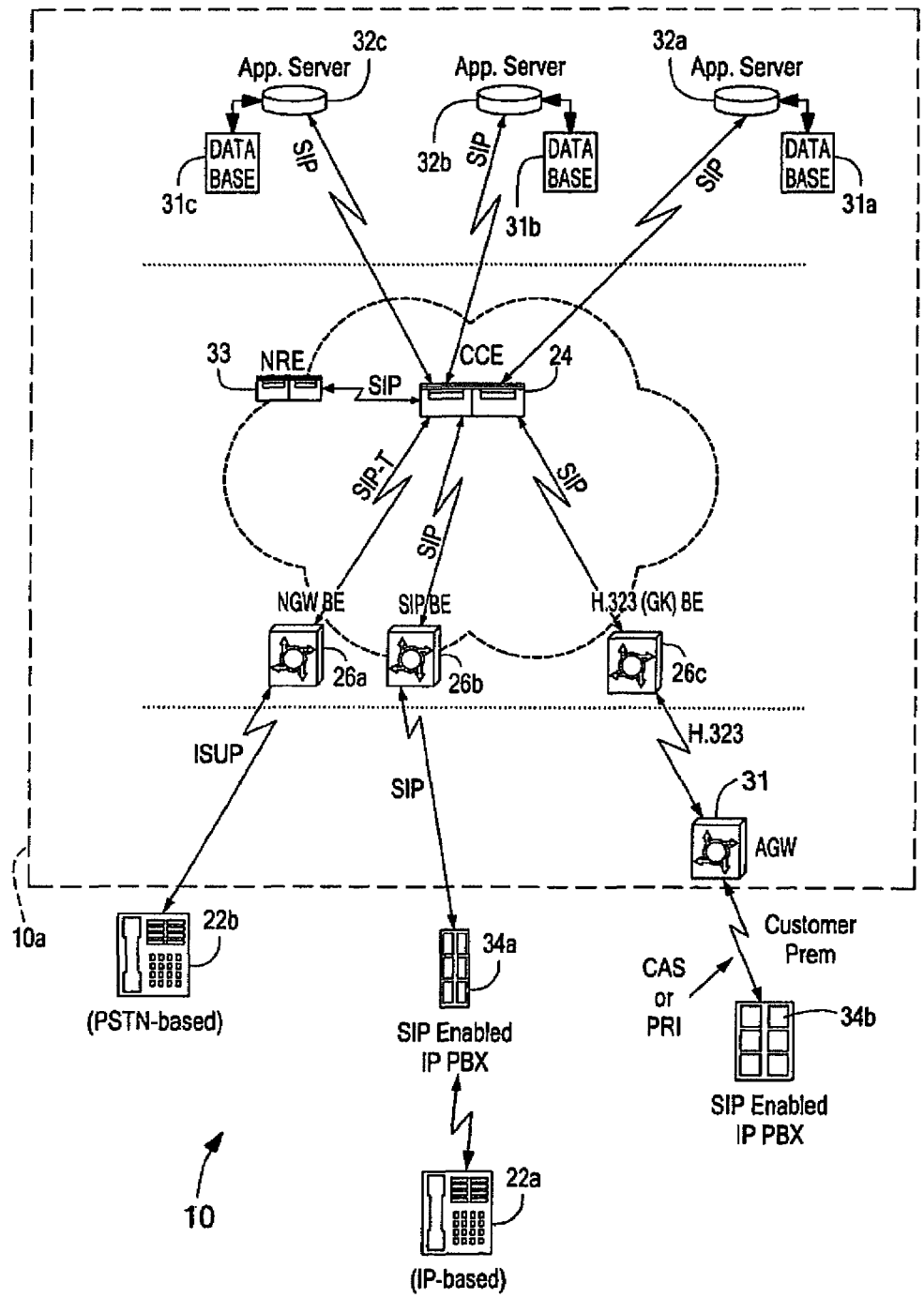
FIG. 2 is an expanded schematic block diagram of the system shown in FIG. 1.

Referring to FIG. 2, in the exemplary embodiment, the multi-media services provider system 10a includes a centrally located Call Control Element 24 (CCE), a plurality of Application Servers (ASs) 32a, 32b, 32c (collectively referred to hereinafter as ASs 32a-32b) at least one Network Routing Engine (NRE) 33 and a plurality of Border Elements (BEs) 26a, 26b, 26c (collectively referred to hereinafter as BEs 26a-26c). The CCE 24 is coupled to the plurality of ASs 32a-32c, to the plurality of BEs 26a-26c and to the NRE 33.

In the exemplary embodiment, the first BE 26a is coupled to the first communication device 22a, via the first PBX 34a and the second BE 26b is coupled to the second communication device 22b. Further, the third BE 26c is coupled to a second PBX 34b, via an access gateway 31, and is adapted for operation using the H.323 protocol. It should be understood that the BEs 26a-26c can be coupled to a plurality of other PBXs and/or communication device (not shown), which are included in other embodiments not specifically shown herein.

The CCE 24, for example, can be provided by Lucent Corporation of Murray Hill, N.J. The CCE 24 may be defined as a back-to-back user agent (B2BUA), which operates to receive a plurality of INVITE messages from any one of the plurality of BEs 26a-26c and upon receipt of the plurality of INVITE messages from the plurality of BEs 26a-26c, the CCE 24 can initiate an equal plurality of INVITE messages to either the NRE 33 or to any one or more of the plurality of ASs 32a-32c. More specifically, depending on instructions provided to the CCE 24 in the incoming INVITE message received from one of the plurality of BEs 26a-26c, the CCE 24 can either send an INVITE message to one or more of the plurality of ASs 32a-32c for feature processing for the call or the CCE 24 can send an INVITE message to the NRE 33 (i.e. feature processing is not required for the call) to bypass the plurality of ASs 32a-32c and set up the call. The CCE 24 is further adapted to maintain the call state between the first 22a and the second 22b communication devices and to generate a call detail record (CDR) based on instructions received from any one or more of the plurality of ASs 32a-32c.

In response to receipt of an INVITE message at the one or more of plurality of ASs 32a-32c, the one or more ASs 32a-32c can provide feature processing for the call and provide SIP Redirect 300 Multiple Choice message (hereinafter "Redirect message") back to the CCE 24 with predetermined feature processing instructions. Similarly, in response to receipt of an INVITE message at the NRE 33, the NRE 33 can execute a process for setting up the call by also sending a Redirect message to the CCE 24.

The CCE 24 is also adapted to use "Third Party Call Control," which is described in the reference, "Third Party Call Control in SIP" by Rosenberg, Peterson, Schulzrinne, Camarillo, RFC-Draft, Internet Engineering Task Force, Mar. 2, 2001," which is herein incorporated by reference. The Third Party Call Control feature of the CCE 24, permits the CCE 24 to create a call in which communication is actually between other parties. For example, an operator can use Third Party Call Control to create a call that connects two participants together, such as the first 22a and second 22b communication devices. Generally, Third Party Call control allows the CCE 24 to connect the various end callers without having the media stream pass through the CCE 24 and yet, the CCE 24 can still maintain call state information.

In the exemplary embodiment, the plurality of BEs 26a-26c can be provided by Lucent Corporation of Murray Hill, N.J. In one embodiment, the plurality of BEs 26a-26c are adapted to use SIP as the signaling protocol for interfacing with the CCE 24. Further, the first BE 26a is adapted to interface to a circuit network (not shown) using an ISDN user port included thereon. The second BEs 26b is adapted to use SIP as the signaling protocol for interfacing with the first 34a PBX. The third BE 26c is adapted to use H.323 as the signaling protocol for interfacing with the second PBX 34b, via the Access Gateway (AGW) 31. In the exemplary embodiment, the plurality of BEs 26a-26c may be thought of as a SIP B2BUA, because each of the BEs 26a-26c generate SIP messages, as well as receive requests from SIP endpoints, such as the SIP-enabled first 34a and second 34b PBXs, and either processes the requests itself or forwards the requests to the CCE 24 for processing.

In the exemplary embodiment, the plurality of ASs 32a-32c can each include a conventional computer server, such as an "NT-Server," which can be provided by Microsoft of Richmond, Wash. or a "Unix Solaris Server," which can be provided by Sun Micro Systems of Palo Alto, Calif. The ASs 32a-32c can be programmed with conventional Web-page interface software such as: "Visual Basic," "Java," "JavaScript," "HTML/DHTML," "C++," "J+," "Perl," or "Perlscript," and "ASP." The ASs 32a-32c can each further be programmed with an operating system, Web server software and Web Application software, such as an e-commerce application and computer network interface software.

In addition, the ASs 32a-32c contain the intelligence needed for offering multimedia services, such as Toll-Free Calling or 800-Service, Virtual Private Networks, and various multimedia features like email, "Click-To-Dial." The intelligence may be comprised of customer logic and data, as well as, common logic and data that are used by all customers. It is necessary for the CCE 24 to access the logic and data in the ASs 32a-32c in order to provide the multi-media services or features.

The ASs 32a-32c can each be further respectively coupled to databases 31a-31c, which each contain a service intelligence layer adapted for providing the plurality of multi-media services described above. The intelligence layer may include customer logic and data, as well as common logic and data that is used by communication devices 22a, 22b, as well as a plurality of other communication devices not specifically shown in FIG. 2.

The NRE 33 also operates as a SIP Redirect Server. The NRE 33 processes INVITE messages received from the CCE 24; performs address resolution based on the routing number returned from the AS 32a-32c and generates a Redirect message. The NRE 33 populates the Redirect message with the IP addresses of one or more destination BEs 26a-26c and sends the Redirect message to the CCE 24.

The first communication device 22a can include a plurality of IP-based devices adapted to operate using the SIP protocol, such as telephones, personal computers and IP-Private Branch Exchanges ("PBXs"). In addition, the first communication device 22a can include a plurality of SIP-enabled wireless devices, such as cellular telephones, pagers and personal digital assistants ("PDAs"). Similarly, the second communication device 22b can include a plurality of PSTN-based devices adapted to operate using the ISUP protocol, such as telephones and personal computers. In addition, the second communication device 22b can include a plurality of PSTN devices such as PBXs connected to CLASS 4 switches (e.g. a toll exchange from which the subscriber connects to the PSTN) or to CLASS 5 switches (e.g. a local exchange from which the subscriber connects to the PSTN).

As described above, the CCE 24 is adapted to receive a call request or INVITE message from the first 22a and/or second 22b communication devices, which requests multi-media services. In response, the CCE 24 can communicate with any one or more of the plurality of application servers 32a-32c and/or the NRE 33 using a number of predetermined INVITE messages for service processing for the request for multi-media services.

After service processing (e.g. featured or non-featured calls), the CCE 24 sends a request to the NRE 33 to provide address resolution processing for the call request and to provide the CCE 24 with instructions, via a Redirect message, as to which of the plurality of BEs 26a-26c an INVITE message should be sent. If the CCE 24 receives a Redirect message from the NRE instructing the CCE 24 to send an INVITE message to the second BE 26b (e.g. Network Gateway BE 26b), the CCE 24 constructs an INVITE message having a first body portion, which includes SDP information associated with the calling or first communication device 22a. Further, the INVITE message constructed by the CCE 24 includes a second body portion having complete address specific information, such as the Nature of Address and the Numbering Plan Type, which are associated with the destination or second communication device 22b. The second body portion of the INVITE message further includes the calling party's Privacy Screening Indicator Information for ISUP signaling.

Thus, the outgoing INVITE message communicated from the CCE 24 to the second communication device 22a, via the second BE 26b, includes at least two payloads defined as the first body portion having the SDP information associated with the calling or first communication device 22a and the second body portion having complete address specific information, as described above. The outgoing INVITE message including the at least two payloads will be described in further detail below.

In an exemplary embodiment, the outgoing INVITE message constructed by the CCE can include the following information:

```
INVITE sip:+17324202238@ngbe1.att.com;user=phone SIP/2.0
Via: SIP/2.0/UDP mt.att.com;branch=1abc77xyz
Max-Forwards: 5
 From: <sip:7324204699@mt.att.com;user=phone>;tag=101
 To: <sip:17324202238@ho.att.com;user=phone>
 Call-ID: c3904563-3119a-2995c 2e322238@cce1.att.com
 CSeq: 8348 INVITE
Record-Route: <cce1.att.com>
 Contact: <sip:7324204699@mt.att.com;user=phone>
Content-Length: 238
Content-Type: multipart/mixed; boundary=unique-boundary-1
MIME-Version: 1.0
 --unique-boundary-1
 Content-Type: application/SDP
 v=0
 o=hsamarasinghe 2890844526 2890842807 IN IP4 126.16.64.4
 s=IP to PSTN test call
 c=IN IP4 ngbe1.att.com
 t= 2873397496 2873404696
 m=audio 4563 RTP/AVP 0
 a=rtpmap:0 PCMU/8000
 --unique-boundary-1
 Content-Type: application/ISUP; version=nxv3;base=esti121
 Content-Disposition: signal; handling=required
 01 00 43 00 01 03 02 00 07 04 10 00 33 38 21
 43 00 47 03 06 0d 03 80 90 a2 07 03 10 03 65
 --unique-boundary-1- -
```

In the exemplary embodiment of the outgoing INVITE message, the outgoing INVITE message includes a header portion, a first body portion and a second body portion. The header portion includes a number of header fields, which in the exemplary embodiment include: INVITE, Via, Max-Forwards, From, To, Call-ID, Cseq, Contact, Content-Length, Content-Type and MIME-Version.

In addition, the outgoing INVITE message includes a first body portion having SDP information related to the first communication device 22a (e.g. IP-based), for example, which initiated the request to the multi-media services provider system 10a for multimedia services. In the exemplary embodiment, the first body portion includes the fields Content-Type, v, o s, c, t, m and a, which are associated with various information related to the first communication device 22a, which initiated the request for multi-media services.

The outgoing INVITE message further includes a second body portion that includes ISUP information, which relates to address information of the destination communication device 22b, for example. In the exemplary embodiment, the second body portion of the outgoing INVITE message is defined as a Multipurpose Internet Mail Extensions (MIME) ISUP media type ("MIME media types for ISUP and QSIG Objects" by Zimmerer et. al. RFC 3204, Internet Engineering Task Force, December, 2001, the subject of which is hereby incorporated by reference). The second body portion includes a number of fields, such as, Content-Type: application/ISUP; version=nxv3; base=esti121, which indicates that a plurality of alpha-numeric values representing the address information of the destination communication device 22b are included in the second body portion. Another field of the second body portion of the outgoing INVITE message includes, Content-Disposition: signal; handling=required, which indicates that predetermined handling of the outgoing INVITE message is required by the destination communication device 22b.

In the exemplary embodiment, the plurality of alpha-numeric values representing the address information of the destination communication device 22b can at least specify the Nature of Address, the Numbering Plan Type (for ISUP), the Calling Party Number, the Privacy Restriction Indicator and Screening Indicator. Further in the exemplary embodiment, the plurality of alpha-numeric values can include: 01 00 43 00 01 03 02 00 07 04 10 00 33 38 21 and 43 00 47 03 06 0d 03 80 90 a2 07 03 10 03 65, and represent the complete address specific information, such as Nature of Address, Numbering Plan Type associated with the destination or second communication device 22b, and the calling party's Privacy Screening Indicator Information for ISUP signaling, which calling party can be operating at the first communication device 22a, for example.

In one exemplary embodiment, the second body portion of the outgoing INVITE message include at least the following information contained in Table-1. It should be understood that many encoding strategies can be employed to encode some or all of the information contained in Table-1 into the second body portion of the outgoing INVITE message, such as ASC II encoding or binary encoding schemes.

TABLE 1

Signaling Parameters

Charge Number (digits)
Collected Address (i.e. digits of dialed number)
Collected Address, Nature of Number
Collected Address, Numbering Plan
Calling Party Number
Calling Party Number, Nature of Number
Calling Party Number, Numbering Plan
Calling Party Number, Privacy Restriction Indicator
Calling Party Number, Screening Indicator
Carrier (digits)
Charge Party Station Type While various features of the present invention are described herein in conjunction with exemplary embodiments having various components using a number of protocols, it should be understood that other suitable components and protocols can be used without departing from the present invention.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto. All references and publications cited herein are expressly incorporated herein by reference in their entirety.

What is claimed is:

1. A method of forming a multi-media communication path between a calling communication device that operates using a first protocol and a destination communication device that operates using a second protocol, comprising:

receiving, by a call control element of a multi-media provider system, a request for a multi-media service;

processing, by the call control element, the request for generating a signaling protocol message, wherein the processing by the call control element is in response to receiving a redirect message from a network routing engine indicating that the signaling protocol message is to be directed towards a gateway border element in communication with a circuit based network of the destination communication device; and sending, by the call control element, the signaling protocol message to the destination communication device to form the multi-media communication path between the calling communication device and the destination communication device, wherein the destination communication device comprises a circuit based communication device and wherein the signaling protocol message includes a header portion, a first body portion and a second body portion separate from and different than the header portion and the first body portion, wherein the second body portion includes predetermined address specific information and calling party's privacy screening indicator information associated with the destination communication device for integrated services digital network user part signaling.

2. The method of claim 1, wherein the providing the integrated services digital network user part signaling information includes providing nature of address information.

3. The method of claim 2, wherein the providing the integrated services digital network user part signaling information further includes providing numbering plan type information.

4. The method of claim 3, wherein the providing the integrated services digital network user part signaling information further includes providing calling party number information.

5. The method of claim 4, wherein the providing the integrated services digital network user part signaling information further includes providing privacy restriction indicator information.

6. The method of claim 5, wherein the providing the integrated services digital network user part signaling information further includes providing a plurality of alpha-numeric values arranged into a predetermined number of signaling parameters representing the integrated services digital network user part signaling information.

7. A system of forming a multi-media communication path between a calling communication device that operates using a first protocol and a destination communication device that operates using a second protocol, comprising:

a call control element:

for receiving a request for a multi-media service;

for processing the request for generating a signaling protocol message, wherein the processing is in response to receiving a redirect message from a network routing engine indicating that the signaling protocol message is to be directed towards a gateway border element in communication with a circuit based network of the destination communication device; and for sending the signaling protocol message to the destination communication device to form the multi-media communication path between the calling communication device and the destination communication device, wherein the destination communication device comprises a circuit based communication device and wherein the signaling protocol message includes a header portion, a first body portion and a second body portion separate from and different than the header portion and the first body portion, wherein the second body portion includes predetermined address specific information and calling party's privacy screening indicator information associated with the destination communication device for integrated services digital network user part signaling.

8. The system of claim 7, wherein the providing the integrated services digital network user part signaling information includes providing nature of address information.

9. The system of claim 8, wherein the providing the integrated services digital network user part signaling information further includes providing numbering plan type information.

10. The system of claim 9, wherein the providing the integrated services digital network user part signaling information further includes providing calling party number information.

11. The system of claim 10, wherein the providing the integrated services digital network user part signaling information further includes providing privacy restriction indicator information.

12. The system of claim 11, wherein the providing the integrated services digital network user part signaling information further includes providing a plurality of alpha-numeric values arranged into a predetermined number of signaling parameters representing the integrated services digital network user part signaling information.

* * * * *